United States Patent [19]

Meo

[11] 4,271,401
[45] Jun. 2, 1981

[54] SAFETY TRAILER HITCH

[75] Inventor: Santino D. Meo, Oakland, Calif.

[73] Assignee: Tri Delta Industries, Inc., Hayward, Calif.

[21] Appl. No.: 65,207

[22] Filed: Aug. 9, 1979

[51] Int. Cl.³ .......................... B60D 1/12; G08B 19/00
[52] U.S. Cl. ................................ 340/52 D; 200/51.1; 200/61.69; 280/432; 340/687
[58] Field of Search ................... 340/52 R, 52 D, 687; 200/51.09, 51.1, 61.69; 180/281, 286; 280/432, 477

[56]  References Cited
U.S. PATENT DOCUMENTS

| | | | |
|---|---|---|---|
| 3,535,679 | 10/1970 | Connors | 340/52 R |
| 3,689,717 | 9/1972 | Westenhaver | 340/52 D X |
| 3,697,974 | 10/1972 | Harris, et al. | 340/52 R |
| 3,710,370 | 1/1973 | Quilici, et al. | 340/52 R |
| 3,734,539 | 5/1973 | Salmi | 340/52 R X |
| 3,792,432 | 2/1974 | Ellis, et al. | 340/52 R |
| 3,815,937 | 6/1974 | Hodgson | 280/432 X |
| 4,030,775 | 6/1977 | Hill | 340/52 R X |
| 4,173,353 | 11/1979 | Steele | 340/52 R X |

*Primary Examiner*—John W. Caldwell, Sr
*Assistant Examiner*—Joseph E. Nowicki
*Attorney, Agent, or Firm*—Manfred M. Warren; Robert B. Chickering; Glen R. Grunewald

[57] ABSTRACT

A safety trailer hitch including a mechanical connection to connect a trailer to a tow vehicle with the mechanical connection secured by a latch, a backup connection between the trailer and the tow vehicle that is releasably secured to the tow vehicle, a first, normally open switch that is positioned to be closed when the mechanical connection is made, a second, normally closed switch that is positioned to be opened when the latch is closed, and a third, normally closed switch that is positioned to be opened when the backup connection is secured to the tow vehicle, with the second and third switches in parallel and in series with the first switch, an alarm and a source of electric energy in an electric circuit with the switches such that when the first switch and either of the second or third switches are closed, the alarm will be actuated.

4 Claims, 6 Drawing Figures

SAFETY TRAILER HITCH

BACKGROUND OF THE INVENTION

Trailers pulled behind vehicles that do not normally pull a trailer, such as passenger cars or pickup trucks, are connected to the tow vehicle with trailer hitches that must be connected to the tow vehicle in such a way as to not interfere with its normal use, such as a passenger car or a pickup truck. Nevertheless, it is necessary for the trailer to be secured very firmly and safely to avoid damage to property or personal injury. The trailer hitch not only must be strong enough to tow the trailer, but in addition it must secure the trailer to the tow vehicle such that it will not come loose during turns, when being towed over bumpy roads, or even when the load is poorly balanced; such as one that would tend to lift the tongue of the trailer away from the connection with the tow vehicle.

In addition to the firm connection between the trailer and the tow vehicle, it is also necessary to provide a means such that the riding lights of the trailer can be accuated by controls within the tow vehicle and, although it is not always present, it is prudent to include some backup connection between the trailer and the tow vehicle.

The most commonly used means for pulling a trailer behind a tow vehicle of the character of a passenger car or pickup truck is a ball and socket connection wherein a ball about 2 inches in diameter and connected along a verticle diameter is fastened preferably to the frame but sometimes to the bumper of the tow vehicle while a cavity or a socket on the tongue of the trailer is adapted to fit snugly over the ball and to be firmly connected to it with some type of latch means that secures the socket around the lower portion of the ball to prevent it from inadvertently being lifted off of the ball.

For a backup safety connection between the trailer and the tow vehicle, it is common to use chains or cables that connect some secure portion of the tow vehicle to some secure portion of the trailer such that if the main connection, for example, the ball and socket connection, fails, the trailer wll not be able to run free on the road, but rather, will be restrained to some path behind the tow vehicle and therefore capable of being steered and stopped.

Although the commercially available trailer hitches and connections between trailers and tow vehicles are quite adequate for performing their task, accidents involving trailers are frequent largely because of carelessness or ignorance in connecting the trailer to the tow vehicle properly.

SUMMARY OF THE INVENTION

This invention is a safety trailer hitch which virtually overcomes accidents resulting from ignorant or careless connections between the trailer and the tow vehicle. The invention includes means for mechanically connecting the trailer to the towing vehicle, which means includes a releasable latch to secure the mechanical connection. Although the invention is not limited to the ball and socket connection that is commonly used, that connection is typical of a connection within the contemplation of this invention. The safety trailer hitch of this invention also includes a backup connection between the trailer and the tow vehicle, and the backup connection also is adapted to releasably secure the trailer to the tow vehicle. Typically, the backup connection includes cables or chains which are adapted to be connected firmly to the tongue of the trailer and to be connected releasably to the trailer hitch on the tow vehicle; usually through eyes or punched holes that are provided in the trailer hitch for just that purpose.

The device of this invention also includes an alarm and a source of electricity. The source of electricity almost invariably will be the battery of the tow vehicle, while the alarm may be any readily discernable indication that the system is not properly connected. An alarm may include a bell or a horn or other noise-making device, it may include a flashing light located at the trailer hitch or on the dash board of the tow vehicle. Any device that is adapted to alert a person that the connection between the trailer and the tow vehicle is not adequate may be used.

The device of this invention also includes a first switch means. The first switch means is normally open and it is located on the device such that it is automatically closed when the trailer is mechanically coupled to the tow vehicle. Typically, the first switch will be positioned so that the actuating portion of the switch protrudes into the spherical chamber of the socket of the trailer so that when that socket is placed around the ball of the tow vehicle, the act of connecting the socket to the ball will automatically close the first switch.

The device of this invention also includes a second switch, and the second switch is normally closed. The second switch is positioned such that it is opened by the act of closing the latch that secures the mechanical connection between the trailer and the tow vehicle. The device of this invention also includes a third switch which is also a normally closed switch. The third switch is positioned to be opened when the backup connection between the trailer and the tow vehicle is secured. Typically, the backup connection is a cable mounted on a take-up reel, and if such is the nature of the backup connection, the switch advantageously is positioned so that the motion of the take-up reel in paying out the cable will open the third switch. The third switch also may be located in the hook or other means for connecting the backup connection to the tow vehicle, but in any event, the third switch must be a normally closed switch that is opened by the act of making the connection between the trailer and the tow vehicle. If additional backup connections between the trailer and the tow vehicle are employed, such as use of two cables, then additional switches, for example a fourth switch, will also be employed and the fourth switch, or other additional switches, will be normally closed switches that are opened by the act of connecting the additional backup connections.

The second and third switches, and the fourth switches and additional switches if they are used, are in parallel connection with one another and all of those parallel-connected switches are in series connection with the first switch. These switches are in a circuit such that when the first switch and any of the other switches are closed, the alarm is actuated. in other words, in order for the alarm to not be actuated, it is necessary that either the first switch be opened; a condition that is found only when the trailer is not connected to the tow vehicle; or that all of the second third fourth or additional switches be opened; a condition that is found only when all of the necessary connections between the trailer and the tow vehicle have been properly made.

DETAILED DESCRIPTION OF THE INVENTION

This invention may be better understood with reference to the accompanying drawings which illustrate one device embodying the invention.

Figure 2:
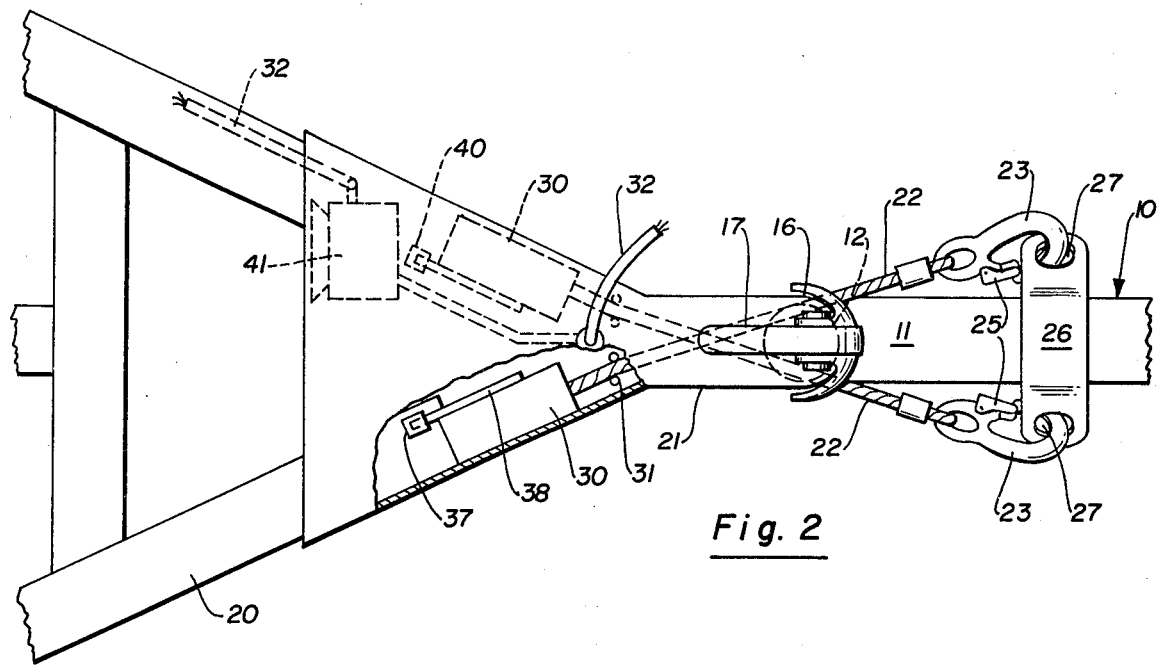
FIG. 2 is a plan view of the device illustrated in FIG. 1 with portions cut away.

The device illustrated in the drawings includes an assembly, generally designated 10, which is connected to a tow vehicle and provides a means for connecting a trailer. The device 10 includes a support 11 to which a ball 12 is connected with a bolt 13 and nut 15. The assembly 10 is preferably firmly connected to the frame of the tow vehicle, but it may be connected to the bumper in accordance with known procedures.

The trailer is connected to the assembly 10 with a primary coupler that includes a socket 16 that fits over the ball 12 and is locked in place by the action of the latch 17 which in turn actuates a coupling latch 18 that moves in place beneath the maximum diameter of the ball 12 and prevents the socket 16 from being lifted from the ball 12 without first uncoupling the coupler latch. The socket is ultimately connected to the tongue of the trailer 20 through structural elements that provide adequate strength and are shown generally as housing 21.

The backup connection between the trailer and the vehicle is provided primarily by cables 22 which terminate in appropriate hook elements 23 having appropriate spring-loaded latches 25 to prevent the hooks 23 from accidentally disengaging with the secondary coupling element 26 that is connected to the tow vehicle coupling assembly 10. The secondary coupling element 26 may be welded or bolted to the assembly 10, and it is provided with holes 27 that are positioned and sized to accommodate connection to hooks 23.

In the embodiment illustrated, cables 22 pay out from reels 30 which are provided with springs so that cable 22 automatically retracts onto reel 30 when it is not connected to secondary coupling means 26. Suitable dogs, as are known to the art, may be provided to reels 30 so that they will lock in the position of engagement shown and maintain the cables in their illustrated position in the event that the primary coupling between the trailer and the tow vehicle becomes disengaged. When desired, guides 31 may be employed to ensure that cable 22 does not rub against sharp edges that would diminish its strength.

Figure 1:
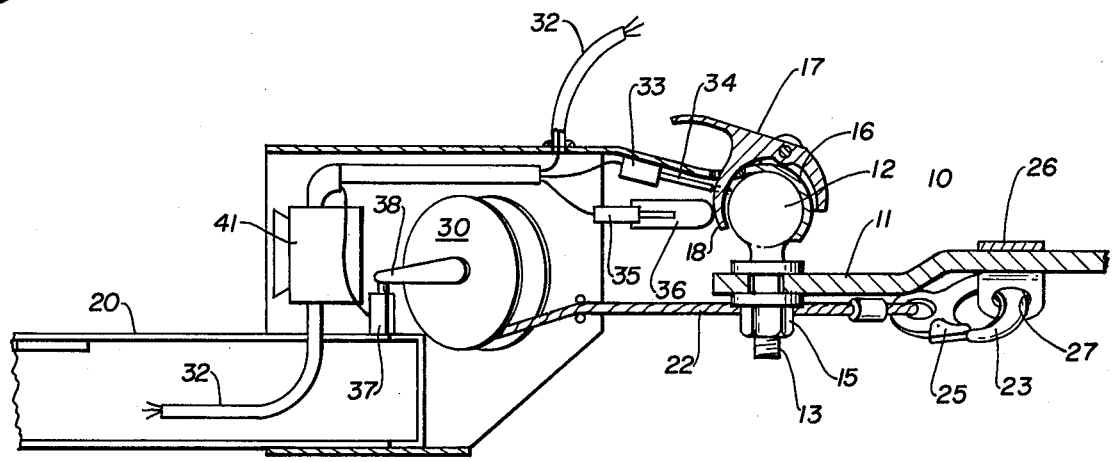
FIG. 1 is an elevation view, partly in section, of a device embodying the invention connected to a towing means such as would be found on a passenger vehicle.

A cable 32 is connected conventionally to the electric system of the tow vehicle and to the various riding lights, brake lights, and turn signal lights of the trailer so that the controls in the tow vehicle will actuate the appropriate lights in the trailer. The cable 11 also provides a source of electric energy to actuate the circuits employed with the invention claimed herein. A normally open switch 33 is positioned so that the actuating element 34 extends into the spherical cavity of the main coupling 16. When the cavity 16 is placed to surround the ball 12, the actuating means 34 closes normally open switch 33. Switch 35 is a normally closed switch and it is actuated by means 36 which in turn is actuated by the motion of latch 17 and primary coupler latch 18. Thus, when latch 17 is depressed so that the primary coupler latch 18 moves beneath the major diameter of ball 12, actuator 36 is pushed to the left, as illustrated in FIG. 1, and thereby opens normally closed switch 35.

Switch 37 is a normally closed switch. Switch 37 is positioned such that actuator arm 38 on reel 30 will actuate switch 37 to open it when cable 22 is paid out from the reel 30. Switch 40 is similarly actuated when the other cable 22 is paid out from its reel 30 for connection to the tow vehicle.

These switches are maintained in circuit with an alarm 41 which is arranged in circuit with the source of electric energy, such as the tow vehicle battery.

Figure 3:
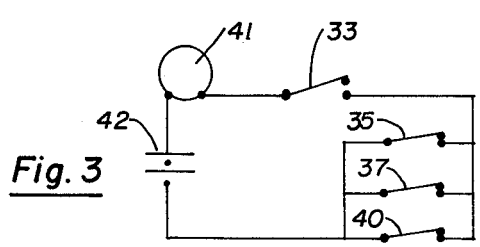
FIG. 3 is a schematic diagram illustrating the position of various switches in an electrical circuit useful in the device of this invention when the device of this invention is not connected to a tow vehicle.

FIGS. 3-6 illustrate the circuit described herein under various conditions. FIG. 3 illustrates the circuit when there is no connection between the tow vehicle and the trailer except an electrical connection that would put battery 42 into the circuit. It is to be understood that having a battery 42 in circuit on the trailer is not a portion of this invention. Battery 42 is shown schematically and it is intended that for almost all purposes the battery of the tow vehicle will be employed as the source of energy for this system and that when the trailer and the tow vehicle are completely disconnected, there will be no equivalent to battery 42 in the circuit. As stated above, FIG. 3 illustrates the circuit as it would appear when there is no mechanical connection between the trailer and the tow vehicle.

Figure 4:
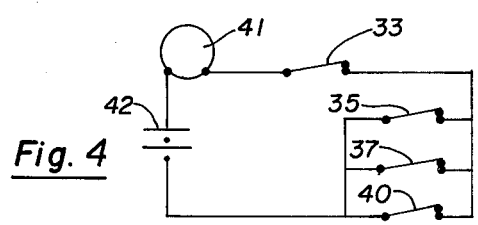
FIG. 4 illustrates the circuit of FIG. 3 as it would be when the connecting means between the trailer and the tow vehicle are engaged but not locked in place.

When the primary coupling involving socket 16 and ball 12 is made, normally open switch 33 becomes closed, as illustrated in FIG. 4, and at that point a circuit is made so that alarm 41 will be actuated. The circuit involves battery 42, switch 33, and all of switches 35, 37, and 40 which are all closed.

Figure 5:
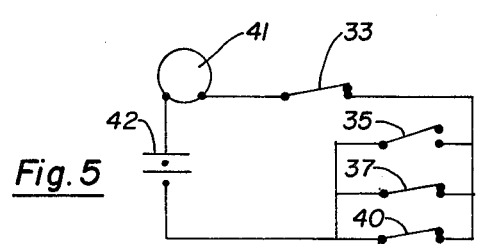
FIG. 5 illustrates the circuit of FIG. 3 as it would appear when the trailer and the tow vehicle are engaged and locked in place with a latch.

In order to lock the socket 16 onto the ball 12, it is necessary that latch 17 be depressed, and the act of depressing latch 17 causes normally closed switch 35 to open. FIG. 5 illustrates the circuit after the primary coupling is made between the trailer and the tow vehicle by placing socket 16 around ball 12 and locking it in place by depressing latch 17. In this condition, alarm 41 is still actuated because a complete circuit is made through switch 33 and both of switches 37 and 40.

Figure 6:
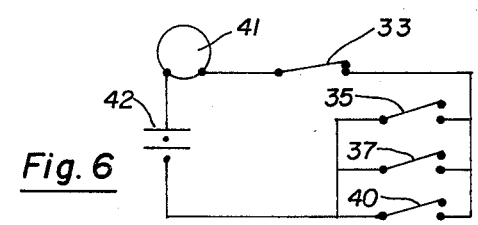
FIG. 6 illustrates the circuit of FIG. 3 when the trailer is completely connected to the tow vehicle, with the connection locked in place and with all backup connections secured.

The next operation in securing the trailer to the tow vehicle is to connect cables 22 to the secondary connection 26 via hooks 23 and holes 27. When this is done, the act of paying cable 22 out from reels 30 causes actuators 38 to actuate normally closed switches 37 and 40 thereby opening them. When cables 22 are securely in place, the condition of the circuit is as illustrated in FIG. 6. In FIG. 6 no complete circuit exists because, although switch 33 is closed, all of switches 35, 37, and 40 are open. In this condition, alarm 41 will not be actuated and the absence of alarm 41 will indicate that the trailer is properly secured to the tow vehicle.

What is claimed is:

1. A device for coupling a trailer to a tow vehicle comprising:
   A. means for mechanically connecting said trailer to said tow vehicle including a releasable latch to secure said mechanical connection means;
   B. a backup connection between said trailer and said tow vehicle which is adapted to releasably secure said trailer to said tow vehicle;
   C. an alarm adapted to be connected to a source of electric energy;
   D. first switch means which is normally open and is positioned to be closed wherein said trailer is mechanically coupled to said tow vehicle;
   E. second switch means which is normally closed and is positioned to be opened when said latch is closed to secure said mechanical connection means;
   F. third switch means which is normally closed and is positioned to be opened when said backup connection is secured; and
   G. said second switch means and said third switch means connected in parallel and in series with said first switch means and said alarm, and said source of electric energy connected to actuate said alarm when said first switch means and any one of said second switch means and third switch means are closed.

2. The device of claim 1 wherein said means for mechanically connecting said trailer and said tow vehicle is a ball and socket joint and an actuating means to open said first switch means is located in said socket and actuated by force exerted by said ball on the interior surface of said socket.

3. The device of claim 1 wherein said backup connection comprises a cable wrapped on a take-up reel.

4. The device of claim 3 wherein said backup connection comprises two cables wrapped on take-up reels, one of said take-up reels being adapted to actuate said third switch and the other take-up reel being adapted with a fourth switch which is normally closed, is opened by mechanically connecting said other cable to said tow vehicle, and is connected in parallel with said second switch means and said third switch means.

* * * * *